(12) United States Patent
Nagata et al.

(10) Patent No.: US 7,903,341 B2
(45) Date of Patent: Mar. 8, 2011

(54) LENS ARRAY OF ERECTING UNIT MAGNIFICATION SYSTEM, IMAGE READING APPARATUS AND IMAGE WRITING APPARATUS USING THE LENS ARRAY, AS WELL AS METHOD FOR MANUFACTURING THE LENS ARRAY

(75) Inventors: Hideshi Nagata, Tokyo (JP); Kenjiro Hamanaka, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 0 days.

(21) Appl. No.: 12/376,210

(22) PCT Filed: Aug. 2, 2007

(86) PCT No.: PCT/JP2007/065192
§ 371 (c)(1),
(2), (4) Date: Feb. 3, 2009

(87) PCT Pub. No.: WO2008/016115
PCT Pub. Date: Feb. 7, 2008

(65) Prior Publication Data
US 2009/0262433 A1    Oct. 22, 2009

(30) Foreign Application Priority Data

Aug. 4, 2006  (JP) .................................. 2006-213609
Aug. 18, 2006 (JP) .................................. 2006-223196

(51) Int. Cl.
*G02B 27/10* (2006.01)
*G02B 3/02* (2006.01)
*B41J 2/435* (2006.01)

(52) U.S. Cl. .......................... 359/622; 359/708; 347/244
(58) Field of Classification Search .................. 347/241, 347/244; 359/621, 622, 626, 708
See application file for complete search history.

(56) References Cited

U.S. PATENT DOCUMENTS

| 7,187,501 B2 * | 3/2007 | Wakisaka ....................... 359/622 |
| 2009/0231698 A1 * | 9/2009 | Hashimoto et al. ........... 359/476 |
| 2010/0014062 A1 * | 1/2010 | Hashimoto et al. ............. 355/55 |

FOREIGN PATENT DOCUMENTS

| JP | 06-175500 A | 6/1994 |
| JP | 09-058052 A | 3/1997 |
| JP | 09-085985 A | 3/1997 |
| JP | 10-62717 A | 3/1998 |
| JP | 11-041410 A | 2/1999 |
| JP | 2000-066316 A | 3/2000 |

(Continued)

*Primary Examiner* — David N Spector
(74) *Attorney, Agent, or Firm* — Knobbe Martens Olson & Bear LLP

(57) ABSTRACT

The conventional lens array of an erecting unit magnification system is composed of an inside lens of spherical shape and an outside lens of spherical or aspherical shape, and has a problem to be improved for the resulting MTF performance. A lens array of an erecting unit magnification system is provided by stacking a first and a second planar-shaped lens array plates. Each of the first and second planar-shaped lens array plates includes a plurality of outside lenses (L1 and L4), which are regularly arranged on one side thereof, and a plurality of inside lenses (L2 and L3), which are regularly arranged on the other side thereof. Especially, the outside lenses (L1 and L4) and the inside lenses (L2 and L3) are formed based on the defining method according to the present invention.

10 Claims, 13 Drawing Sheets

FOREIGN PATENT DOCUMENTS

| | | |
|---|---|---|
| JP | 2000-352606 A | 12/2000 |
| JP | 2001-322309 A | 11/2001 |
| JP | 2002-258019 A | 9/2002 |
| JP | 3371017 | 11/2002 |
| JP | 2003-215450 A | 7/2003 |
| JP | 2004-009655 A | 1/2004 |
| JP | 2004-209703 A | 7/2004 |
| JP | 2004-336201 A | 11/2004 |
| JP | 2005-037891 A | 2/2005 |

* cited by examiner

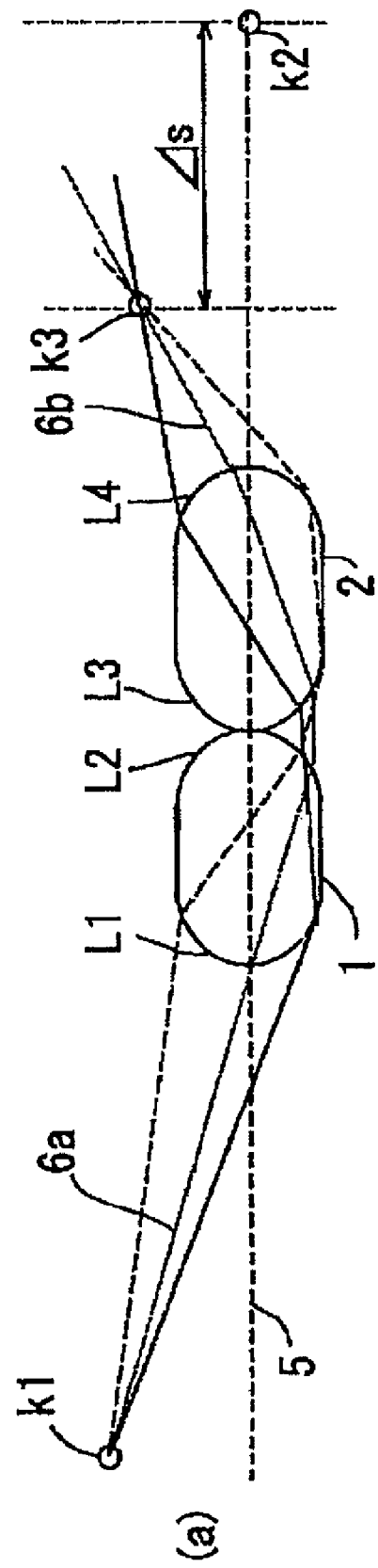

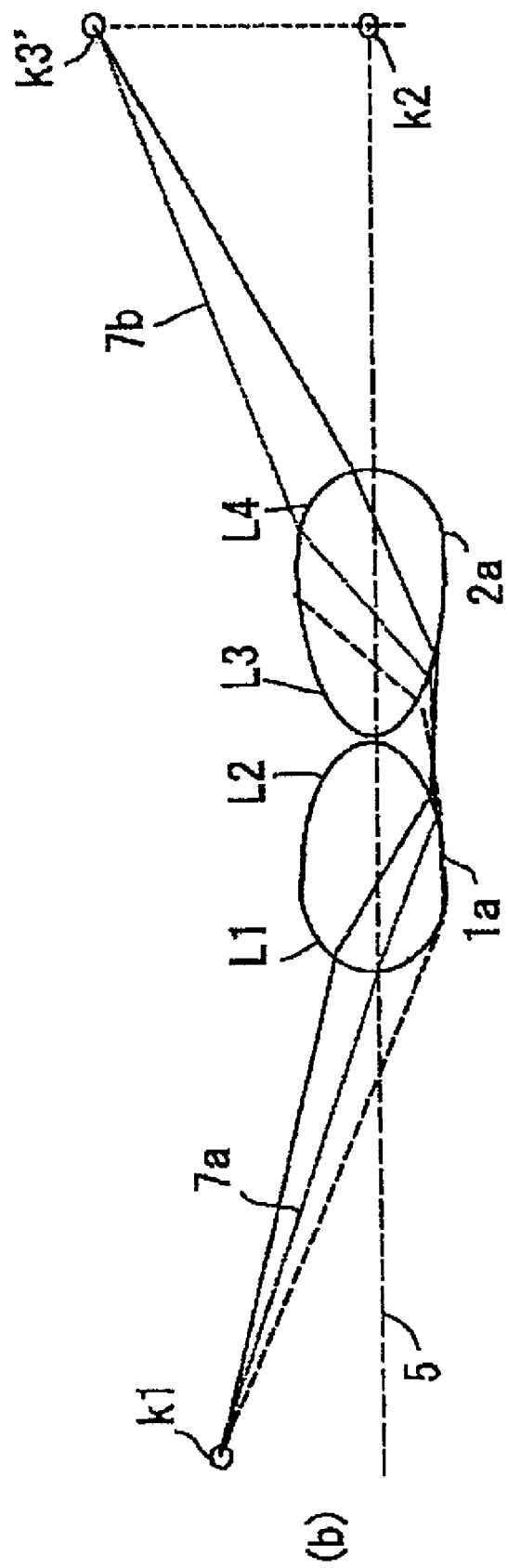

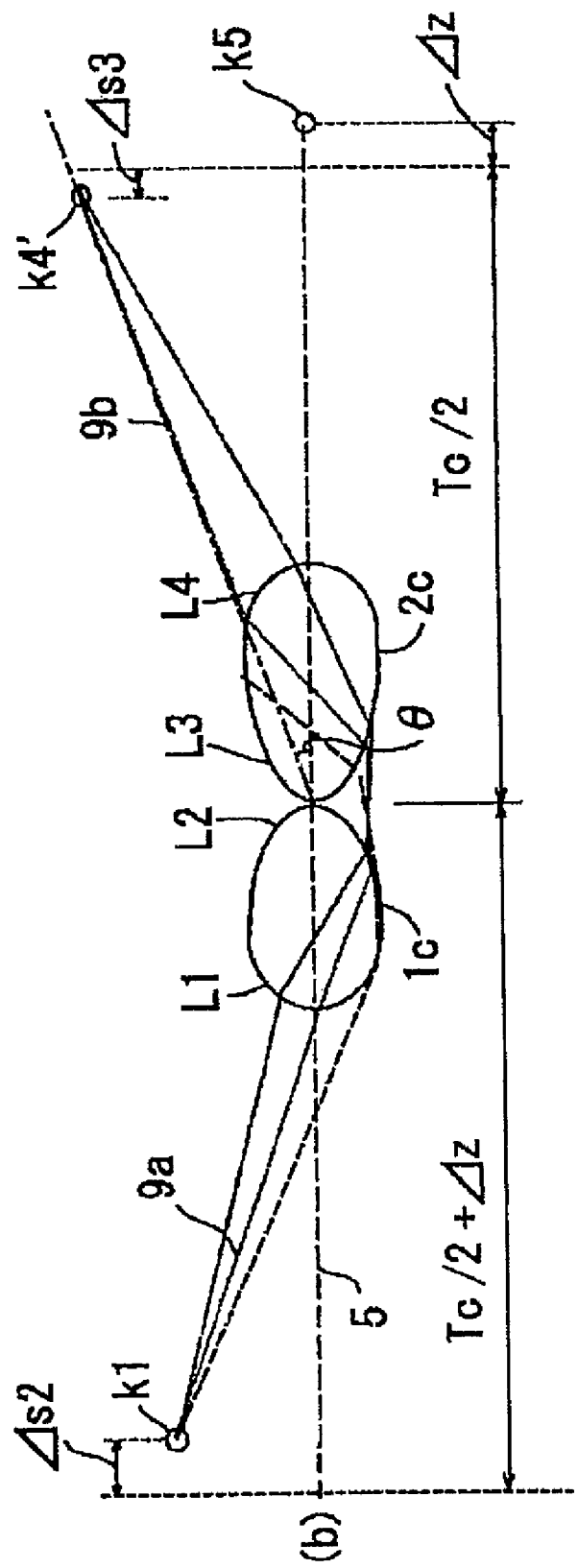

LENS ARRAY OF ERECTING UNIT MAGNIFICATION SYSTEM, IMAGE READING APPARATUS AND IMAGE WRITING APPARATUS USING THE LENS ARRAY, AS WELL AS METHOD FOR MANUFACTURING THE LENS ARRAY

This application is U.S. National Phase of International Application PCT/JP2007/065192, filed Aug. 2, 2007 designating the U.S., and published in Japanese as WO 2008/016115 on Feb. 7, 2008, which claims priority to Japanese Patent Applications Nos. 2006-213609 and 2006-223196, filed Aug. 4, 2006 and Aug. 18, 2006, respectively.

TECHNICAL FIELD

The present invention relates to a lens array of an erecting unit magnification system, an image reading apparatus and an image writing apparatus using the lens array, as well as a method for manufacturing the lens array, and particularly relates to a lens array of an erecting unit magnification system with spherical and aspherical, micro convex-lenses.

RELATED ART

For a prior art, a planar-shaped lens array plate is known as a lens array of an erecting unit magnification system that is used for an image reading apparatus and an image writing apparatus (for example, it is disclosed in a patent document 1, Japanese Patent Application Laid-Open No. 2005-37,891). The planar-shaped lens array plate may be a resin material, and, for example, may be formed by an injection molding method.

FIGS. 9A and 9B show schematic diagrams of a planar-shaped lens array plate. FIG. 9A is a plan view of a planar-shaped lens array plate, and FIG. 9B is a cross-sectional view in the depicted A-A' of the planar-shaped lens array plate shown in FIG. 9A. As shown in FIGS. 9A and 9B, the long planar-shaped lens array plate 1 comprises a plurality of micro convex-lenses 16. FIG. 10 shows schematic diagram of an optical system using a lens array of an erecting unit magnification system, which is used for a lens array plate of an image reading apparatus and an image writing apparatus. A lens array 10 of an erecting unit magnification system is arranged by stacking two lens array plates 1 so that the optical axis of each micro convex lens of lens array plates 1 at the upper and lower is coaxial.

In FIG. 10, the light 14a obtained from a light-emitting point 11 (e.g., the reflected light from an original for an image reading apparatus, and e.g., the irradiated light from a light-emitting element for an image writing apparatus) is focused through the lens array 10 of the erecting unit magnification system (indicated by 14b) on a focusing point 12. The micro convex lenses are arranged in lens-forming area of the planar-shaped lens array plate 1 fixed by a housing 13. The micro convex lenses are generally formed in both sides of the planar-shaped lens array plate 1.

FIG. 11 is a cross-sectional view of a lens array of an erecting unit magnification system. Each optical axis of the micro convex lenses (typically, each micro-convex lens is shown as L1, L2, L3, and L4) formed in both sides of the planar-shaped lens array plate 1 is composed on coaxial. In addition, in order to stack the plurality of the planar-shaped lens array plates 1, conical convex portions 23a are provided on one surface of the planar-shaped lens array plate 1 and concave portions 23b to be fixed with each of the conical convex portion 23a are provided on the other surface of the planar-shaped lens array plate 1. Thus, the plurality of the planar-shaped lens array plates 1 can be stacked so that the optical axis of each of micro convex lenses, for example, L1, L2, L3, and L4, are respectively coaxial, and thereby the lens array plate 10 of the erecting unit magnification system may be arranged. Besides, the micro convex lenses may be generally defined by the lens thickness "t", the lens diameter "D", and the lens curvature radius "r" to specify the shape of the micro convex lens, as shown in FIG. 11. For a conventional lens array of an erecting unit magnification system, an inside lens of spherical shape is used for the micro convex lens on the inside of the plate (hereinafter, it is referred to as an inside lens), such as L2 and L3, and an outside lens of spherical or aspherical shape is used for the micro convex lens on the outside of the plate (hereinafter, it is referred to as an outside lens), such as L1 and L4.

Here, the lens of spherical shape means the lens to which the lens curvature radius in the shape of lens is formed in constant. The lens of aspherical shape means the lens has the shape other than spherical shape, i.e., the lens to which the lens curvature radius in the shape of lens is formed in irregular.

Patent document 1: Japanese Patent Application Laid-Open No. 2005-37,891

DISCLOSURE OF THE INVENTION

Problems to be Solved by the Invention

However, the lens arrangement, which is provided the micro convex lenses of an erecting unit magnification system with the spherical shape for the inside lens and the spherical or aspherical shape for the outside lens, has larger optical aberration of on-optical axis and off-optical axis in the lens array of an erecting unit magnification system.

More specifically, for example, in the conventional lens array of an erecting unit magnification system used for a contact image sensor of the image reading apparatus the number of pixels of the contact image sensor used for the image formation of one lens array of an erecting unit magnification system becomes presently from several pixels to ten-odd pixels. One example with image formation state of the lens array of the erecting unit magnification system is now described. The erecting unit magnification system is provided so that the position of one image formation is identical with one pixel positioned on the optical axis. In this case, the other image formation position, for example, the other pixel position corresponding to the viewing angle of the off-optical axis may be shifted with respect to the image formation position on the optical axis due to the optical aberration. Thus, the conventional lens array of an erecting unit magnification system has a problem to be improved for the resulting MTF performance.

The object of the present invention is to provide a lens array of an erecting unit magnification system that has lower deterioration of the optical performance, to solve the above problem in prior art.

Means for Solving the Problem

In order to solve the above problems, a lens array of an erecting unit magnification system is provided, the lens array comprising a first planar-shaped lens array plate that includes a plurality of a first outside lenses, which are regularly arranged on one side thereof, and a plurality of a first inside lenses, which are regularly arranged on the other side thereof; and a second planar-shaped lens array plate that includes a plurality of a second outside lenses, which are regularly arranged on one side thereof, and a plurality of a second inside lenses, which are regularly arranged on the other side thereof, wherein the first and the second planar-shaped lens array plates are stacked so that the first inside lens and the second inside lens are mutually faced, and each of the first and the second inside lenses has a first aspherical shape so as to decrease the optical aberration of on-optical axis and off-optical axis.

According to another aspect of the present invention, an image reading apparatus is provided, the image reading apparatus comprising a light source for irradiating of light into an original being put on an original glass plate; a plurality of light-receiving element lines for receiving the reflected light from the irradiated original to read the image information of the original; and an erecting unit magnification lens array for focusing the reflected light from the original onto the plurality of light-receiving element lines, wherein the erecting unit magnification lens array comprises said lens array of the erecting unit magnification system according to the present invention.

According to another aspect of the present invention, an image writing apparatus is provided, the image writing apparatus comprising a plurality of light-emitting element lines, each of the plurality of light-emitting element lines having a plurality of light-emitting elements; a photo-sensitive dram for entering the image information based on the emitted light from the light-emitting elements; and an erecting unit magnification lens array for focusing the emitted light from the light-emitting element lines onto the photo-sensitive dram, wherein the erecting unit magnification lens array comprises said lens array of the erecting unit magnification system according to the present invention.

According to another aspect of the present invention, a method for manufacturing an erecting unit magnification lens array is provided, the method comprising the step (a) of forming a first planar-shaped lens array plate; the step (b) of forming a second planar-shaped lens array plate; and the step (c) of stacking the first and the second planar-shaped lens array plates, so that a plurality of a first inside lenses with aspherical shape, which are regularly arranged on one side of the first planar-shaped lens array plate, and a plurality of a second inside lenses with aspherical shape, which are regularly arranged on one side of the second planar-shaped lens array plate, are faced to combine on coaxial. The step (a) further includes the step (d) of forming the first inside lenses, and the step (e) of forming a plurality of a first outside lenses with aspherical shape to regularly arrange the first outside lenses on the other side of the first planar-shaped lens array plate. The step (b) further includes the step (f) of forming the second inside lenses, and the step (g) of forming a plurality of a second outside lenses with aspherical shape to regularly arrange the second outside lenses on the other side of the second planar-shaped lens array plate. The method includes the step (h) of forming the first and the second outside lenses based on the steps (e) and (g), after forming the first and the second inside lenses based on the steps (d) and (f).

The Effect of the Invention

According to the present invention, a lens array of an erecting unit magnification system that has lower deterioration of the optical performance can be provided.

BRIEF DESCRIPTION OF THE DRAWINGS

FIG. 1A is a diagram showing the image formation state of micro convex lenses being composed of inside and outside lenses of aspherical shape independent of the defining method of the present invention;

FIG. 1B is a diagram showing the image formation state of micro convex lenses being composed of inside lenses of aspherical shape according to the defining method of the present invention and outside lenses of aspherical shape independent of the defining method of the present invention;

FIG. 2B is a diagram showing the image formation state of micro convex lenses being composed of inside and outside lenses of aspherical shape being formed based on the defining method of the inside and outside lens according to the present invention;

BEST MODE FOR CARRYING OUT THE INVENTION

Figure 2A:
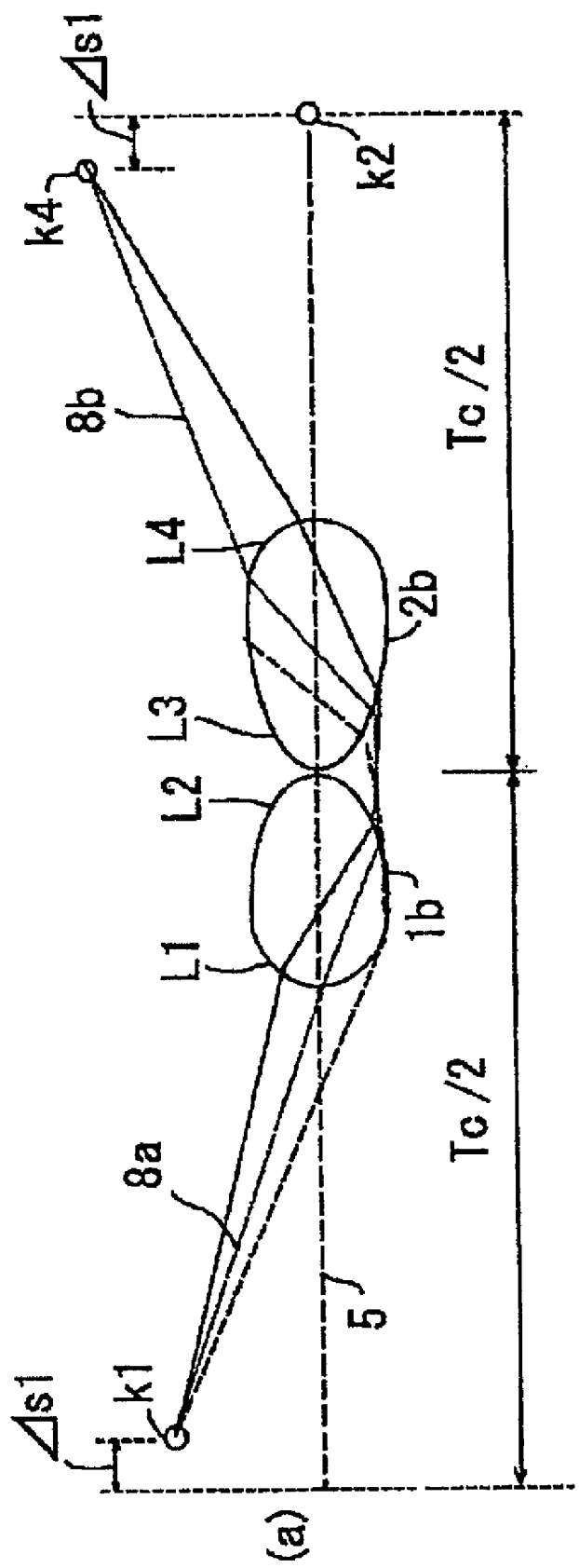
FIG. 2A is a diagram showing the image formation state of micro convex lenses being composed of inside lenses of aspherical shape being formed based on the defining method of the inside lens according to the present invention and outside lenses of aspherical shape independent of the defining method of the present invention.

At first, the critical factors of an inside lens being formed based on specific defining method according to the present invention are described to facilitate the understanding of the present invention.

FIGS. 1A and 1B are a diagram showing the image formation state of micro convex lenses of a planar-shaped lens array plate being provided for an erecting unit magnification lens array. The image formation state of micro convex lenses being composed of inside and outside lenses of aspherical shape independent of the defining method of the present invention is shown in FIG. 1A, to enable the comparison with the present invention. In addition, the image formation state of micro convex lenses being composed of inside lenses of aspherical shape according to the defining method of the present invention and outside lenses of aspherical shape independent of the defining method of the present invention is shown in FIG. 1B.

As shown in FIG. 1A, an outside lens L1 and an inside lens L2, which are provided on a planar-shaped lens array plate 1, and an outside lens L4 and an inside lens L3, which are provided on a planar-shaped lens array plate 2, are maintained on coaxial line 5, by which the light from the light-emitting point (not shown) is focused on the image formation position k2 of on-optical axis. In such a lens array of an erecting unit magnification system, the light 6a irradiated from the light-emitting point k1 at given viewing angle (for example, 18°) is focused on the image formation position k3 through optical path 6b. Therefore, the optical aberration of Δs is caused between the image formation position k2 of on-optical axis and the image formation position k3 of on-optical axis. Such optical aberration may cause the decrease of the optical resolution ability, i.e., the decrease of MTF for an original put at the position k2 of on-optical axis. While the inside and outside lenses with aspherical shape are described in FIG. 1A, the similar phenomenon may be caused even if either the inside lens or the outside lens or both are composed as spherical shape. That is, this may be considered as the problem that the conventional lens array of an erecting unit magnification system possesses.

Similarly, for optical system of the present invention shown in FIG. 1B, an outside lens L1 and an inside lens L2, which are provided on a planar-shaped lens array plate 1a, and an outside lens L4 and an inside lens L3, which are provided on a planar-shaped lens array plate 2a, are maintained on coaxial line 5, by which the light from the light-emitting point (not shown) is focused on the image formation position k2 of on-optical axis. However, unlike the optical system shown in FIG. 1A, the inside lenses L2 and L3, which are provided on the planar-shaped lens array plates 1a and 2a, have aspherical shape being specified by the defining method described later. In such a lens array of an erecting unit magnification system, the light 7a irradiated from the light-emitting point k1 at given viewing angle (for example, 18°) is ideally focused on the image formation position k3' through optical path 7b. Therefore, the optical aberration is not caused between the image formation position k2 of on-optical axis and the image formation position k3' of on-optical axis. Thus, these lenses cause the ideal optical resolution ability, i.e., the high MTF for an original to be put at the position k2 of on-optical axis. While the inside and outside lenses with aspherical shape are described in FIG. 1B, the similar phenomenon may be caused by forming the aspherical shape of the inside lens with the defining method of the present invention, even if the lens array of an erecting unit magnification system is provided using the outside lens of spherical shape.

Then, the critical factors of an outside lens being formed based on the specific defining method according to the present invention are described.

FIGS. 2A and 2B are a diagram showing the image formation state of micro convex lenses of a planar-shaped lens array plate being provided for an erecting unit magnification lens array based on the defining method according to the present invention. The image formation state of micro convex lenses composed of inside lenses of aspherical shape, which are formed based on the defining method of the inside lens according to the present invention, and outside lenses of aspherical shape, which are independent of the defining method of the present invention, is shown in FIG. 2A, to enable the comparison with FIG. 2B. In addition, the image formation state of micro convex lenses being composed of inside and outside lenses of aspherical shape being formed based on the defining method of the inside and outside lens according to the present invention is shown in FIG. 2B.

As shown in FIG. 2A, an outside lens L1 and an inside lens L2, which are provided on a planar-shaped lens array plate 1b, and an outside lens L4 and an inside lens L3, which are provided on a planar-shaped lens array plate 2b, are maintained on coaxial line 5, by which the light from the light-emitting point (not shown) is focused on the image formation position k2 of on-optical axis. In the optical system shown in FIG. 2A, the outside lenses L1 and L4 provided on the planar-shaped lens array plate 1b and 2b are composed of outside lenses of aspherical shape independent of the defining method of the present invention, and the inside lenses L2 and L3 are composed of inside lenses of aspherical shape being specified by the defining method described later. In such a lens array of an erecting unit magnification system, the light 8a irradiated from the light-emitting point k1 at given viewing angle (for example, 18°) is focused on the image formation position k4 through optical path 8b. In this case, the optical aberration of Δs1 is caused between the image formation position k2 of on-optical axis and the image formation position k4 of on-optical axis. However, this means that the much improved MTF is obtained relative to the above described optical aberration of Δs, and this optical system may cause the high MTF for an original to be put at the position k2 of on-optical axis. While the outside lens with aspherical shape independent of the defining method of the present invention is described in FIG. 2A, the similar phenomenon may be caused according to the lens array of an erecting unit magnification system of the present invention even if the inside lens is composed as spherical shape.

Then, an outside lens formed by the defining method of the present invention is described to further improve an optical performance of a lens array of an erecting unit magnification system. As shown in FIG. 2B, an outside lens L1 and an inside lens L2, which are provided on a planar-shaped lens array plate 1c, and an outside lens L4 and an inside lens L3, which are provided on a planar-shaped lens array plate 2c, are maintained on coaxial line 5, by which the light from the light-emitting point (not shown) is focused on the image formation position k5 of on-optical axis. In the optical system shown in FIG. 2B, the outside lenses L1 and L4, and the inside lenses L2 and L3, which are provided on the planar-shaped lens array plate 1c and 2c, are composed of lenses of aspherical shape being specified by the defining method described later. In such a lens array of an erecting unit magnification system, the light 9a irradiated from the light-emitting point k1 at given viewing angle (for example, 18°) is focused on the image formation position k4' through optical path 8b.

Here, the optical aberration of Δs2 (Δs2=Δz+Δs3) is caused between the image formation position k5 of on-optical axis and the image formation position k4' of on-optical axis. This optical aberration includes the shift amount of Δz from the image formation position at on-optical axis for an original to be put, and the shift amount of Δs3 from the image formation position at given viewing angle (for example, 18°). This means that the improved MTF is substantially obtained relative to the above-described optical aberration of Δs1 of the present invention. Thus, the aspherical shape of the outside lenses L1 and L4 may be suitably formed to obtain the image formation position predefined with the shift amount Δz for the image formation position of on-optical axis, with respect to the original to be put at the position k2 of on-optical axis (refer to FIG. 2A) according to the defining method of the present invention. Thereby, this means that the MTF may be much improved relative to the optical system shown in FIG. 2A. In addition, such improved MTF is compared in embodiments described later by a specific numerical value.

The conjugation length Tc used for a peculiar defining method described later in accordance with the present invention is length decided by the light-emitting point (not shown) on an optical axis and the original position to be put. Moreover, the viewing angle θ is an angle to the on-optical axis when the on-optical axis through the lens center position is reference.

Then, the defining method of the aspherical shape of an inside lens in the specific defining method according to the present invention are described.

Figure 3A:
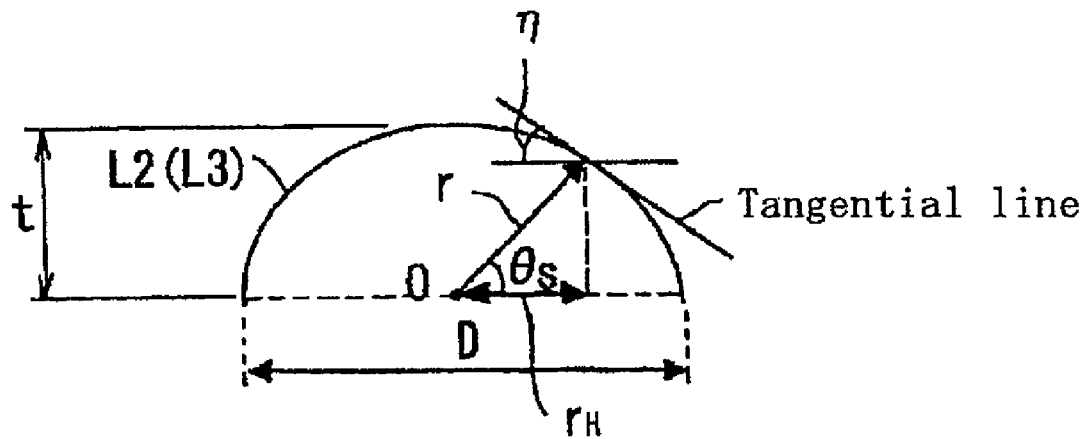
FIG. 3A is a diagram indicating the defining method of the inside lens of aspherical shape according to the present invention.
Figure 9:
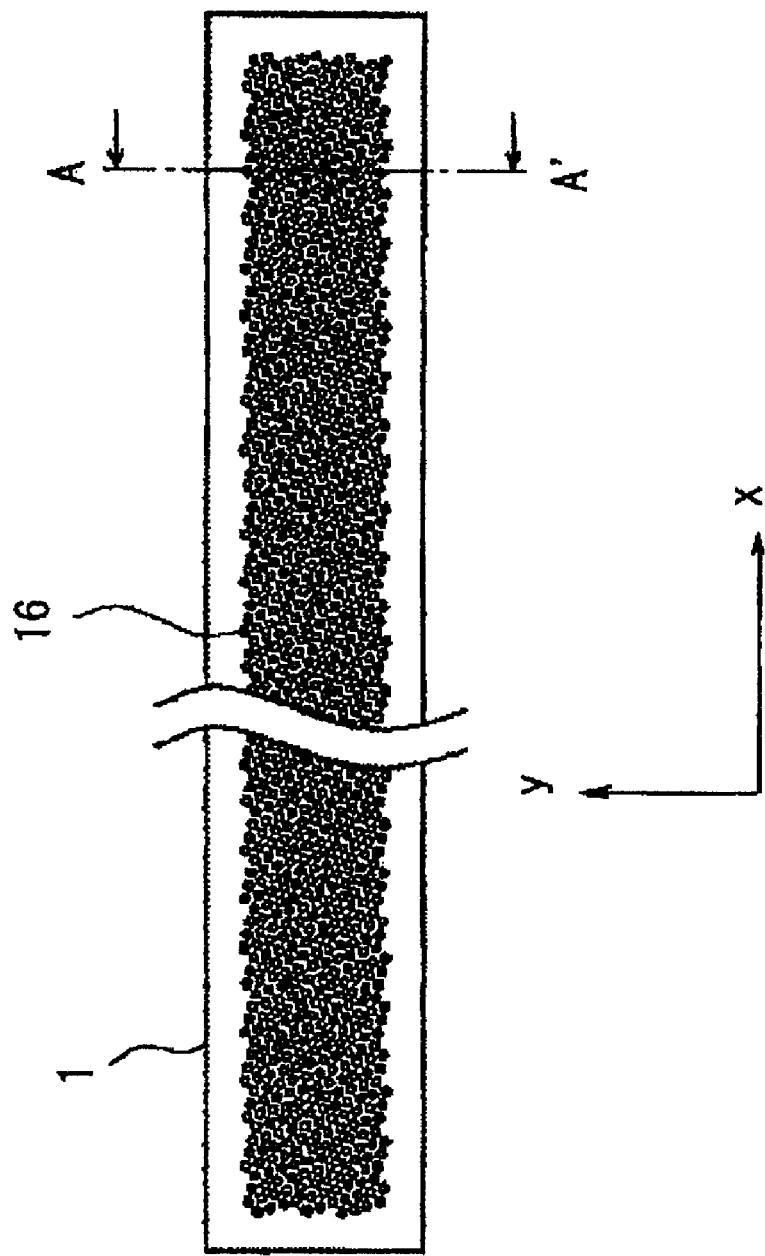
FIG. 9A is a plan view of a planar-shaped lens array plate.
FIG. 9B is a cross-sectional view in the depicted A-A' of the planar-shaped lens array plate shown in FIG. 9A.
Figure 10:
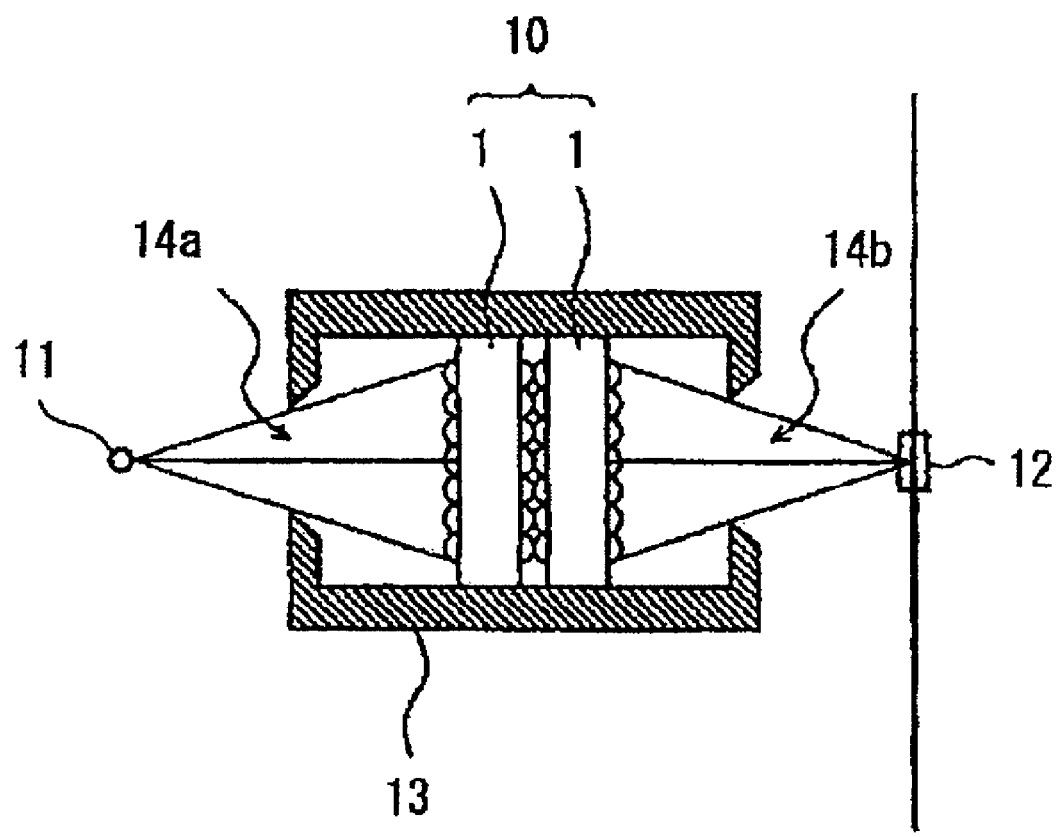
FIG. 10 is a schematic view of an optical system of a lens array of an erecting unit magnification system using a planar-shaped lens array plate used for an image reading apparatus or an image writing apparatus.
Figure 11:
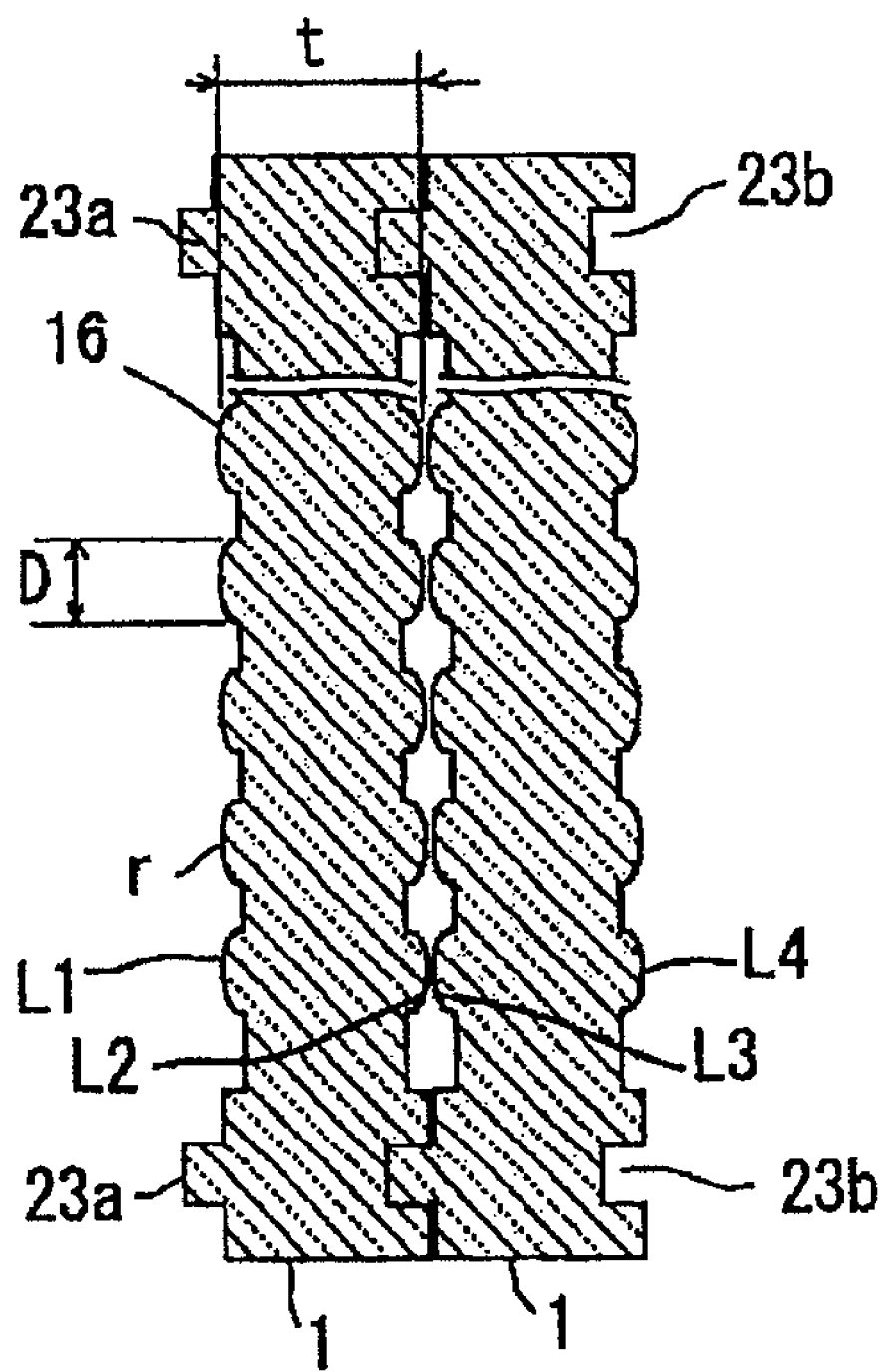
FIG. 11 is a cross-sectional view of a planar-shaped lens array of an erecting unit magnification system.

The lens of aspherical shape can be specified to achieve the present invention by new defining method, while it is usually difficult to represent the lens of aspherical shape with the generalized expression. FIG. 3A is a diagram indicating the defining method of the inside lens of aspherical shape according to the present invention. The inside lens L2 (or L3) of aspherical shape shown in FIG. 3A may be considered to as a cross-sectional view of the inside lens of aspherical shape in the cross-sectional direction A-A' as depicted in FIG. 9A (refer to FIG. 9B).

Thus, as shown in FIG. 3A, a lens has aspherical shape in vertical direction with respect to the lens thickness t, and the cross-section of the lens that includes the shown lens center O has circular-shape of the lens diameter D. Moreover, the angle η means the angle between the tangential line of the inside lens L1 (or L3) of aspherical shape with respect to the center O through the lens diameter D and the direction of the lens diameter D. The curvature radius r means the distance from the center O to the inside lens surface of aspherical shape (hereinafter, it is referred to as the curvature radius). In addition, the radius $r_H$ in the cross-section (hereinafter, it is referred to as the section radius) of the inside lens L2 (or L3) of aspherical shape can be represented with $r_H = r \cdot \cos\theta s$, when the angle θs is given as the angle between directions of the curvature radius r and the lens diameter D.

Moreover, any shape of lens may be represented by a first curvature correlation function $f_1(r_H, \sin\eta)$ with any section radius, $r_H$, and any characteristic value, sin η (hereinafter, it is referred to as the first curvature correlation function $f_1()$ as an arbitrary function). If the lens shape shown in FIG. 3A has spherical shape, the relation between $r_H$ and sin η becomes linear with typical curvature radius like the following numerical expression.

$$r_H = R \cdot \cos\theta s = R \cdot \sin\eta \, (-90° \leq \eta \leq 90) \quad (1)$$

Therefore, when the linear relation of the numerical expression (1) is given (in which the lens shape is spherical shape), the lens shape may be represented by a second curvature correlation function $f_2(r_H, \sin\eta)$ defined by any section radius, $r_H$, and any characteristic value, sin η (hereinafter, it is referred to as the second curvature correlation function $f_2()$ as an arbitrary function).

Then, the first curvature correlation function $f_1()$ and the second curvature correlation function $f_2()$ can be related according to the present invention. That is, the degree, Δ sin η, of aspherical shape (hereinafter, it is referred to as the aspherical degree) with respect to the aspherical shape of typical curvature radius R represents the aspherical degree at a certain section radius, $r_H = r_{H1}$.

Figure 3B:
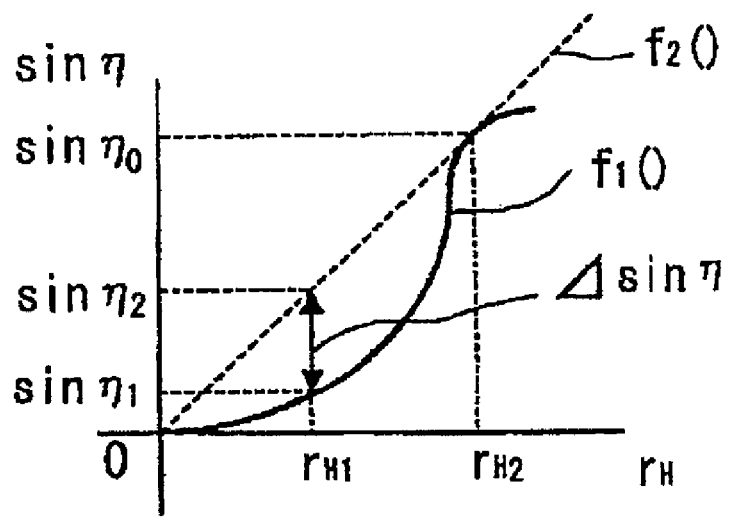
FIG. 3B is a schematic diagram indicating a first curvature correlation function according to the present invention.

The first curvature correlation function $f_1()$ and the second curvature correlation function $f_2()$ are schematically shown in FIG. 3B. As shown in FIG. 3B, it is shown by horizontal axis, $r_H$, versus vertical axis, sin η. The first curvature correlation function $f_1()$ is a function that provides for aspherical shape based on the present invention, and it is shown as the curve. The second curvature correlation function $f_2()$ is a function that provides for spherical shape, and it is shown as straight line. On a certain section radius, $r_H = r_{H1}$, in FIG. 3B, $\sin\eta_1$ in the first curvature correlation function $f_1()$ and $\sin\eta_2$ in the second curvature correlation function $f_2()$ can be obtained. Moreover, on a certain section radius, $r_H = r_{H2}$, in FIG. 3B, $\sin\eta_0$ in the first curvature correlation function $f_1()$ and the second curvature correlation function $f_2()$ can be obtained. Therefore, Δ sin η representative of the maximum aspherical deflection is given as the following numerical expression.

$$\Delta\sin\eta = \sin\eta_1 - \sin\eta_2 \, (\Delta\sin\eta < 0) \quad (2)$$

Therefore, in order to specify the inside lens of aspherical shape, it only has to define the first curvature correlation function $f_1()$ so that the second curvature correlation function $f_2()$ having the typical curvature radius R has Δ sin η that indicates the aspherical degree.

Arbitrary curvature radius r defined by the first curvature correlation function $f_1()$ may easily specify the degree of the aspherical shape, and thereby this is useful for the formation of the lens.

Then, as for obtaining suitable aspherical shape described in FIG. 2A and FIG. 2B, the first curvature correlation function $f_1()$ defining the aspherical shape of the inside lens L2 (or, L3) is described.

First, the section radius $r_H$ and the lens thickness t of one lens plate are normalized to be able to calculate any optical system more handily for the description of the defining method obtaining a suitable image formation state.

The normalized section radius $R_H$ is represented as a ratio with the half-value of the lens diameter D to normalize the section radius $r_H$ as follows.

$$R_H = r_H / (D/2) \quad (3)$$

The lens of any aspherical shape may be defined by the first curvature correlation function $f_1()$ of dimensionless value defined with the normalized section radius $R_H$ and the characteristic value, sin η, according to numerical expression (3).

Moreover, the lens thickness t of one lens plate is defined as the relative lens thickness B being a ratio of the lens thickness t to the conjugation length Tc, which is represented as following numerical expression.

$$B = 2 \times t / Tc \quad (4)$$

Figure 4:
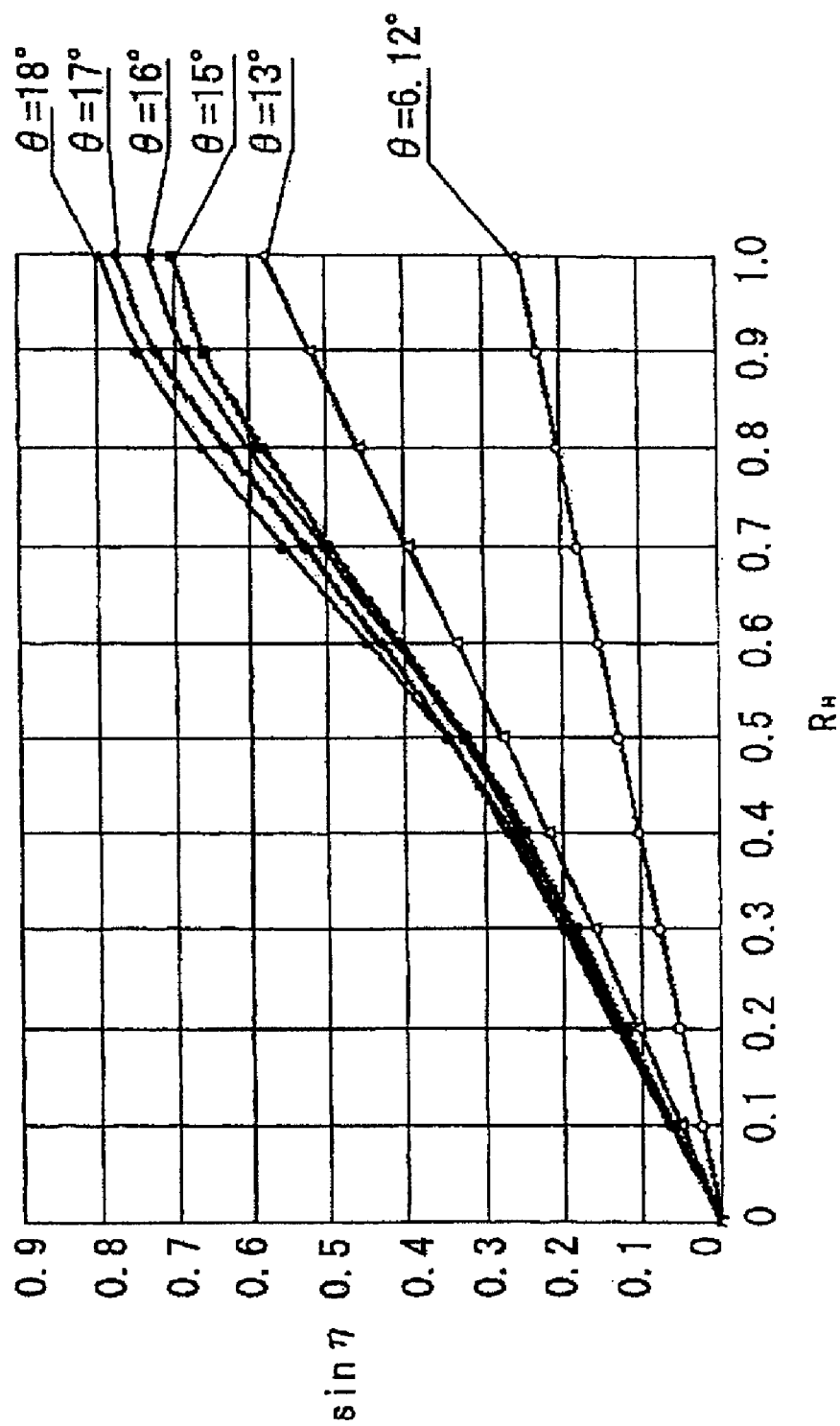
FIG. 4 is an example of the characteristic of the first curvature correlation function $f_1(\ )$.

Then, the calculation example of a suitable range for the shape of the inside lens defined by the first curvature correlation function $f_1()$ is described. Moreover, FIG. 4 shows the characteristic of the first curvature correlation function $f_1()$ in viewing angle from 6.12° to 18°.

Calculation Example

Here, $R_H$ is made to dimensionless value by numerical expression (3), and becomes $R_H = 1$ at $r_H = D/2$. When the first curvature correlation function $f_1()$ is defined so that the characteristic value, sin η, with aspherical shape is identical with the characteristic value, sin η, with the typical curvature radius R, the characteristic value described later may be obtained, in which the first curvature correlation function $f_1()$ is represented by the function of characteristic value, sin η, within the range of $0 \leq R_H \leq 1$.

The first curvature correlation function $f_1()$ is able to defined as the characteristic value, sin η, with respect to the normalized section radius $R_H$, in which the relative lens thickness B and the viewing angle θ become parameters. Moreover, in order to define the inside lens of the suitable aspherical shape shown in FIG. 2A and FIG. 2B, a first curvature correlation function $f_1()$ can be calculated by pre-specifying the characteristic value, sin η, with respect to each normalized section radius $R_H$, and approximating the first curvature correlation function $f_1(\ )$ from each of said characteristic values through the least square method.

Here, each of $Kt_1$, $Kt_2$, $Kt_3$, and $Kt_4$ is the correction coefficient based on B=0.297 (for example, the conjugation length Tc=0.297 mm and the lens thickness t=1.35 mm), and is represented by the following numerical expression, respectively.

$$Kt_1 = -13.86714395 \times B^2 + 7.59963921 \times B^3 - 0.03088594 \quad (5)$$

$$Kt_2 = -17.544747528 \times B^2 + 9.695816062 \times B^3 - 0.332052736 \quad (6)$$

$$Kt_3 = -32.13903336 \times B^2 + 17.0990929 \times B^3 - 1.2434786 \quad (7)$$

$$Kt_4 = -19.139000715 \times B^2 + 7.927266912 \times B^3 - 0.333837108 \quad (8)$$

First, the first curvature correlation function $f_1(\ )$ in the relative lens thickness, B=0.297, and the viewing angle, θ=6.12°, is defined by the following numerical expression (θ=6.12° shown in FIG. 4).

$$\sin\eta = 0.00006965 \times Kt_1 \times R_H^4 - 0.0058437 \times Kt_2 \times R_H^3 + 0.800028075 \times Kt_3 \times R_H^2 + 0.25692955 \times Kt_4 \times R_H \quad (9)$$

Similarly, the first curvature correlation function $f_1(\ )$ in the relative lens thickness, B=0.297, and the viewing angle, θ=13°, is defined by the following numerical expression (θ=13° shown in FIG. 4).

$$\sin\eta = 6.91654151 \times R_H^6 - 16.76699365 \times R_H^5 + 14.32515949 \times Kt_1 \times R_H^4 - 5.16637659 \times Kt_2 \times R_H^3 + 0.84912548 \times Kt_3 \times R_H^2 + 0.46837891 \times Kt_4 \times R_H \quad (10)$$

Similarly, the first curvature correlation function $f_1(\ )$ in the relative lens thickness, B=0.297, and the viewing angle, θ=15°, is defined by the following numerical expression (θ=15° shown in FIG. 4).

$$\sin\eta = -1.40531407 \times Kt_1 \times R_H^4 + 2.37231321 \times Kt_2 \times R_H^3 - 0.97421934 \times Kt_3 \times R_H^2 + 0.71243454 \times Kt_4 \times R_H \quad (11)$$

Similarly, the first curvature correlation function $f_1(\ )$ in the relative lens thickness, B=0.297, and the viewing angle, θ=16°, is defined by the following numerical expression (θ=16° shown in FIG. 4).

$$\sin\eta = -1.48624118 \times Kt_1 \times R_H^4 + 2.61565478 \times Kt_2 \times R_H^3 - 0.16023702 \times Kt_3 \times R_H^2 + 0.76782911 \times Kt_4 \times R_H \quad (12)$$

Similarly, the first curvature correlation function $f_1(\ )$ in the relative lens thickness, B=0.297, and the viewing angle, θ=17°, is defined by the following numerical expression (θ=17° shown in FIG. 4).

$$\sin\eta = -1.6345639 \times Kt_1 \times R_H^4 + 2.94584148 \times Kt_2 \times R_H^3 - 1.37327164 \times Kt_3 \times R_H^2 + 0.84031130 \times Kt_4 \times R_H \quad (13)$$

Similarly, the first curvature correlation function $f_1(\ )$ in the relative lens thickness, B=0.297, and the viewing angle, θ=18°, is defined by the following numerical expression (θ=18° shown in FIG. 4).

$$\sin\eta = -1.88143986 \times Kt_1 \times R_H^4 + 3.14614544 \times Kt_2 \times R_H^3 - 1.22904130 \times Kt_3 \times R_H^2 + 0.76092915 \times Kt_4 \times R_H \quad (14)$$

In order to obtain the suitable aspherical shape of the inside lens described in FIG. 2A and FIG. 2B at arbitrary viewing angle θ, it can be calculated by the proportional value based on said arbitrary viewing angle θ from the values of sin η with respect to the normalized section radius $R_H$, which are provided by any of numerical expressions (9) to (14) using the defined viewing angles adjacent to said arbitrary viewing angle θ. For example, in order to obtain sin η at θ=14°, sin η=0.584 at the adjacent viewing angle θ=13° and sin η=0.704 at the adjacent viewing angle θ=15° are firstly calculated, in case of $R_H$=1 based on the numerical expressions (10) and (11). Then, the characteristic value sin η=(0.584+0.704)/2=0.644 at θ=14° can be obtained, as the θ=14° is the mean value of θ=13° and θ=15°. Finally, the first curvature correlation function $f_1(\ )$ in θ=14° can be obtained while calculating at $0 \leq R_H \leq 1.0$ by a similar manner. Thus, the first curvature correlation function $f_1(\ )$ in the arbitrary viewing angle θ with respect to $6.12° \leq θ \leq 18°$ may be calculated with high accuracy.

Figure 5:
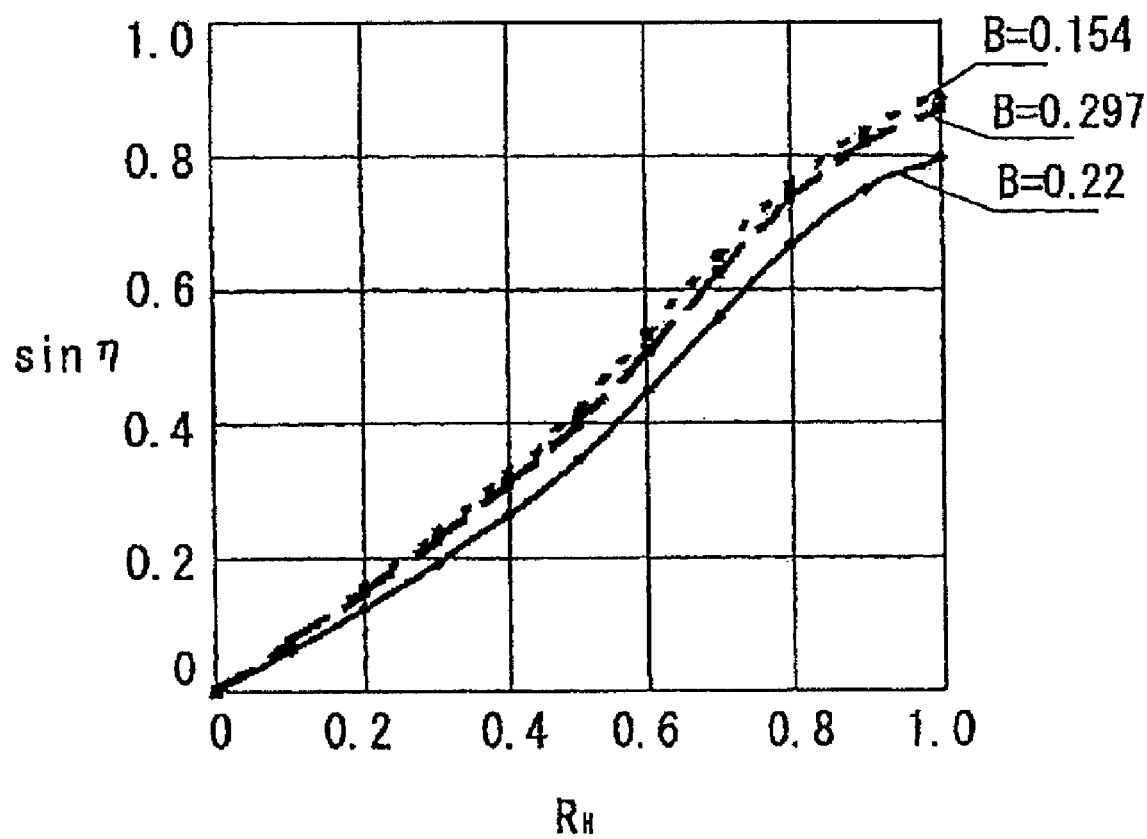
FIG. 5 is an example of the characteristic between the characteristic value, $\sin \eta$, and the relative lens thickness B in viewing angle $\theta = 18°$.

Moreover, the suitable range of the characteristic value, sin η, indicated in numerical expressions (9) to (14) may be shifted in response to the lens thickness t, while the first curvature correlation function $f_1(\ )$ in relative lens thickness B=0.297 (for example, the conjugation length, Tc=9.1 mm, and the lens thickness t=1.35 mm) is shown in FIG. 4. FIG. 5 is an example of the characteristic between the characteristic value, sin ↓, and the relative lens thickness B in viewing angle θ=18°. In FIG. 5, each of the first curvature correlation functions $f_1(\ )$ in the relative lens thickness B=0.154 (for example, the conjugation length Tc=9.1 mm and the lens thickness t=0.70 mm), the relative lens thickness B=0.297 (for example, the conjugation length Tc=9.1 mm and the lens thickness t=1.00 mm), and the relative lens thickness B=0.220 (for example, the conjugation length Tc=9.1 mm and the lens thickness t=1.35 mm) is shown. It is understood to tend to increase the value of the first curvature correlation function $f_1(\ )$, in response to decreasing of the lens thickness t to obtain the suitable aspherical shape of the inside lens shown in FIG. 2A and FIG. 2B.

Moreover, there is no necessity for strictly forming of aspherical shape to decrease the optical aberration between on-optical axis and off-optical axis shown in FIG. 2A and FIG. 2B as the value obtained by the numerical expressions (9) to (14). Thus, the suitable range of sin $η_f$ necessary for the lens shape is given as follows.

$$0.95 \times \sin\eta \leq \sin\eta_f \leq \sin\eta \times 1.06 \quad (15)$$

As a result, the aspherical shape of the inside lens (L2 and L3) may be suitably formed to decrease the optical aberration of on-optical axis and off-optical axis, on the basis of the design information of the conjugation length Tc, the lens thickness t, and the viewing angle θ.

Then, as to the aspherical shape of an outside lens, the defining method of obtaining a suitable image formation state (the image formation position of shift amount Δz) of the optical system described in FIG. 2B is described.

The aspherical shape of an outside lens may be defined to obtain the suitable image formation state of the optical system described in FIG. 2B (the image formation position of shift amount Δz) after defining aspherical shape of the inside lens as described above. That is, the aspherical shape of an outside lens may be suitably formed to shift the image formation position of on-optical axis onto the position predefined by the shift amount Δz, with regard to the original to be put at the position k2 of on-optical axis (refer to FIG. 2A). This aspherical shape of the outside lens may be quantitatively provided by defining the conjugation length Tc, the viewing angle θ, and the shift amount Δz. Here, it is able to calculate the aspherical shape of the outside lens subject to defining the conjugation length Tc, the viewing angle θ, and the shift amount Δz after providing the aspherical shape of the inside lens by a known optical system calculation program. However, such an optical system calculation program is not the subject of the present invention.

First, in order to define the shape of the outside lens to obtain the suitable image formation state, the shift amount $\Delta z$ is normalized as described later, so that the inside lens has been normalized to the conjugation length Tc.

The relative-shift amount $\Delta z'$ is represented by the following numerical expression as the normalized shift amount being the ratio of the shift amount $\Delta z$ to the conjugation length Tc.

$$\Delta z' = \Delta z / Tc \quad (16)$$

The relative-shift amount $\Delta z'$ may be defined on the basis of the value of the viewing angle $\theta$. When the viewing angle in the lens array of an erecting unit magnification system is assumed to be $\theta$, said relative-shift amount $\Delta z'$ may be represented as the function $f_{s1}(\ )$ defined only by the viewing angle $\theta$ by the following numerical expression.

$$\Delta z' = \Delta z / Tc = f_{s1}(\theta) \quad (17)$$

Figure 6:
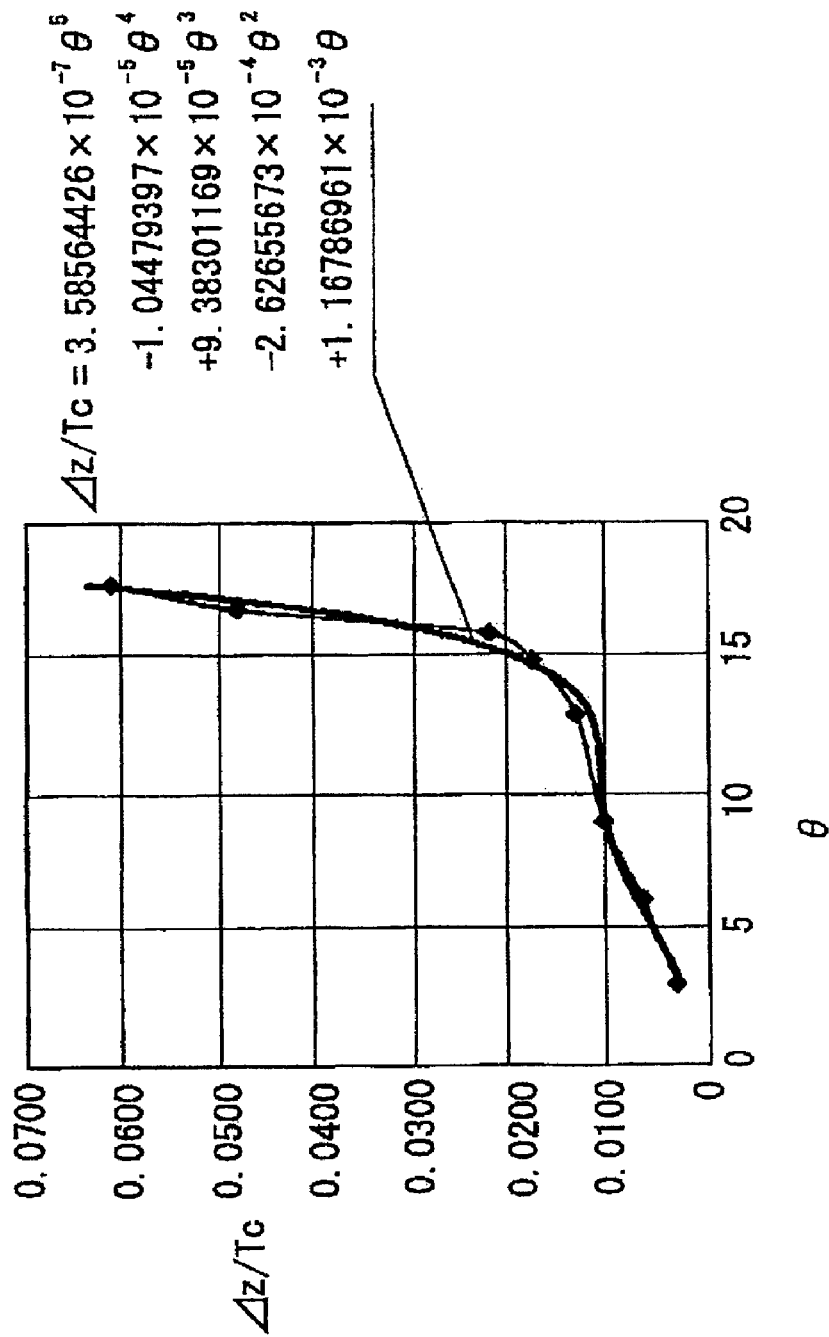
FIG. 6 is an example of the characteristic between viewing angle $\theta$ and the relative-shift amount $\Delta z'$.

In order to describe the concrete example of function $f_{s1}(\ )$, the characteristics of the viewing angle $\theta$ and the relative-shift amount $\Delta z'(\Delta z/Tc)$ is shown in FIG. 6. The relation between the viewing angle $\theta$ and the relative-shift amount of $\Delta z'$ is approximated as shown in FIG. 6. That is, by calculating of the least square method from some calculation values of the relative-shift amount $\Delta z'$ precalculated with respect to the given viewing angle $\theta$ so as to obtain the optical image formation position (the image formation position of the shift amount $\Delta z$) described in FIG. 2B, it enables to obtain the following numerical expression.

$$\begin{aligned}\Delta z' = \Delta z/Tc = {} & 3.58564426 \times 10^{-7}\theta^5 - \\ & 1.04479397 \times 10^{-5}\theta^4 + 9.38301169 \times 10^{-5}\theta^3 - \\ & 2.62655673 \times 10^{-4}\theta^2 + 1.16786961 \times 10^{-3}\theta\end{aligned} \quad (18)$$

Thus, the aspherical shape of an outside lens may be suitably formed by providing like numerical expression (18) so as to shift the image formation position of on-optical axis to the position predefined by the shift amount $\Delta z$, with respect to the original to be put at the position k2 of on-optical axis (refer to FIG. 2A).

Then, the allowable value of the relative-shift amount $\Delta z'$ is specifically described to form the lens shape of an outside lens (L1 and L4) on the basis of the above defining method.

The relative-shift amount $\Delta z'$ calculated by the numerical expression (18) can have the allowable value. Specifically, the allowable value $\Delta z_d$ used to form the outside lens is satisfied within the following numerical expression.

$$0.78 \times \Delta z' \leq \Delta z_d \leq 1.07 \times \Delta z' \quad (19)$$

The viewing angle $\theta$, the conjugation length Tc, and the lens thickness t are parameters demanded on an image reading apparatus etc., using a lens array of an erecting unit magnification system. The optical system may suitably obtain the image formation position (the image formation position of the shift amount $\Delta z$) described in FIG. 2B, if the inside lens or the outside lens is provided based on the above description. This is concretely clarified by embodiments described later.

Then, the effect of each embodiment in the lens array of an erecting unit magnification system is described, and each embodiment of an image reading apparatus and an image writing apparatus using the lens array of an erecting unit magnification system are described. First, each of a first to a third embodiments in the lens array of an erecting unit magnification system in accordance with the present invention is described relative to the conventional lens array of an erecting unit magnification system.

A First Embodiment

The lens array of the erecting unit magnification system in prior art and the lens array in a first embodiment of the present invention have been provided by simulation to calculate each optical resolution (MTF). These lens array have the conjugation length Tc=9.1 mm, the lens thickness 1.35 mm of an inside lens and an outside lens (i.e., the relative lens thickness B=0.297), and the viewing angles $\theta$=18°. The lens array of the erecting unit magnification system in the first embodiment of the present invention is composed of the inside lens or the outside lens being formed based on the numerical expressions (29) and (33). Comparing each optical resolution (MTF) in 12 lpm (line-pair/mm) and 24 lpm (line-pair/mm), Table 1 can be obtained. As noted from Table 1, the first embodiment enables to greatly improve the optical resolution (MTF) relative to the prior art. Here, the aspherical shape of the outside lens (L1 and L4) in a first conventional example of the prior art has been formed to obtain the image formation state in the shift amount $\Delta z$=0.

TABLE 1

| | | Optical resolution (MTF) | |
|---|---|---|---|
| | Lens structure | 12 lpm | 24 lpm |
| First embodiment | L2, L3: Aspherical L1, L4: Aspherical | 77% | 50% |
| First conventional example | L2, L3: Spherical L1, L4: Aspherical | 56% | 14% |
| Second conventional example | L2, L3: Spherical L1, L4: Spherical | 32% | 14% |

Then, a second embodiment in the lens array of an erecting unit magnification system in accordance with the present invention is described relative to the conventional lens array of an erecting unit magnification system.

A Second Embodiment

The lens array of the erecting unit magnification system in prior art and the lens array in a second embodiment of the present invention have been provided by simulation to calculate each optical resolution (MTF). These lens array have the conjugation length Tc=9.1 mm, the lens thickness 1.00 mm of an inside lens and an outside lens (i.e., the relative lens thickness B=0.222), and the viewing angles $\theta$=18°. The lens array of the erecting unit magnification system in the second embodiment of the present invention is composed of the inside lens or the outside lens being formed based on the numerical expressions (29) and (33). Comparing each optical resolution (MTF) in 12 lpm (line-pair/mm) and 24 lpm (line-pair/mm), Table 2 can be obtained. As noted from Table 2, the second embodiment enables to greatly improve the optical resolution (MTF) relative to the prior art. Here, the aspherical shape of the outside lens (L1 and L4) in a third conventional example of the prior art has been formed to obtain the image formation state in the shift amount $\Delta z$=0.

TABLE 2

|  | Lens structure | Optical resolution (MTF) | |
|---|---|---|---|
|  |  | 12 lpm | 24 lpm |
| Second embodiment | L2, L3: Aspherical L1, L4: Aspherical | 77% | 51% |
| Third conventional example | L2, L3: Spherical L1, L4: Aspherical | 60% | 21% |
| Fourth conventional example | L2, L3: Spherical L1, L4: Spherical | 28% | 14% |

Then, a third embodiment in the lens array of an erecting unit magnification system in accordance with the present invention is described relative to the conventional lens array of an erecting unit magnification system.

A Third Embodiment

The lens array of the erecting unit magnification system in prior art and the lens array in a third embodiment of the present invention have been provided by simulation to calculate each optical resolution (MTF). These lens array have the conjugation length Tc=9.1 mm, the lens thickness 0.70 mm of an inside lens and an outside lens (i.e., the relative lens thickness B=0.154), and the viewing angles θ=18°. The lens array of the erecting unit magnification system in the third embodiment of the present invention is composed of the inside lens or the outside lens being formed based on the numerical expressions (29) and (33). Comparing each optical resolution (MTF) in 12 lpm (line-pair/mm) and 24 lpm (line-pair/mm), Table 3 can be obtained. As noted from Table 3, the third embodiment enables to greatly improve the optical resolution (MTF) relative to the prior art. Here, the aspherical shape of the outside lens (L1 and L4) in a fifth conventional example of the prior art has been formed to obtain the image formation state in the shift amount Δz=0.

TABLE 3

|  | Lens structure | Optical resolution (MTF) | |
|---|---|---|---|
|  |  | 12 lpm | 24 lpm |
| Third embodiment | L2, L3: Aspherical L1, L4: Aspherical | 73% | 48% |
| Fifth conventional example | L2, L3: Spherical L1, L4: Aspherical | 65% | 34% |
| Sixth conventional example | L2, L3: Spherical L1, L4: Spherical | 25% | 11% |

Then, an image reading apparatus using a lens array of an erecting unit magnification system according to the present invention is described.

Image Reading Apparatus

Figure 7:
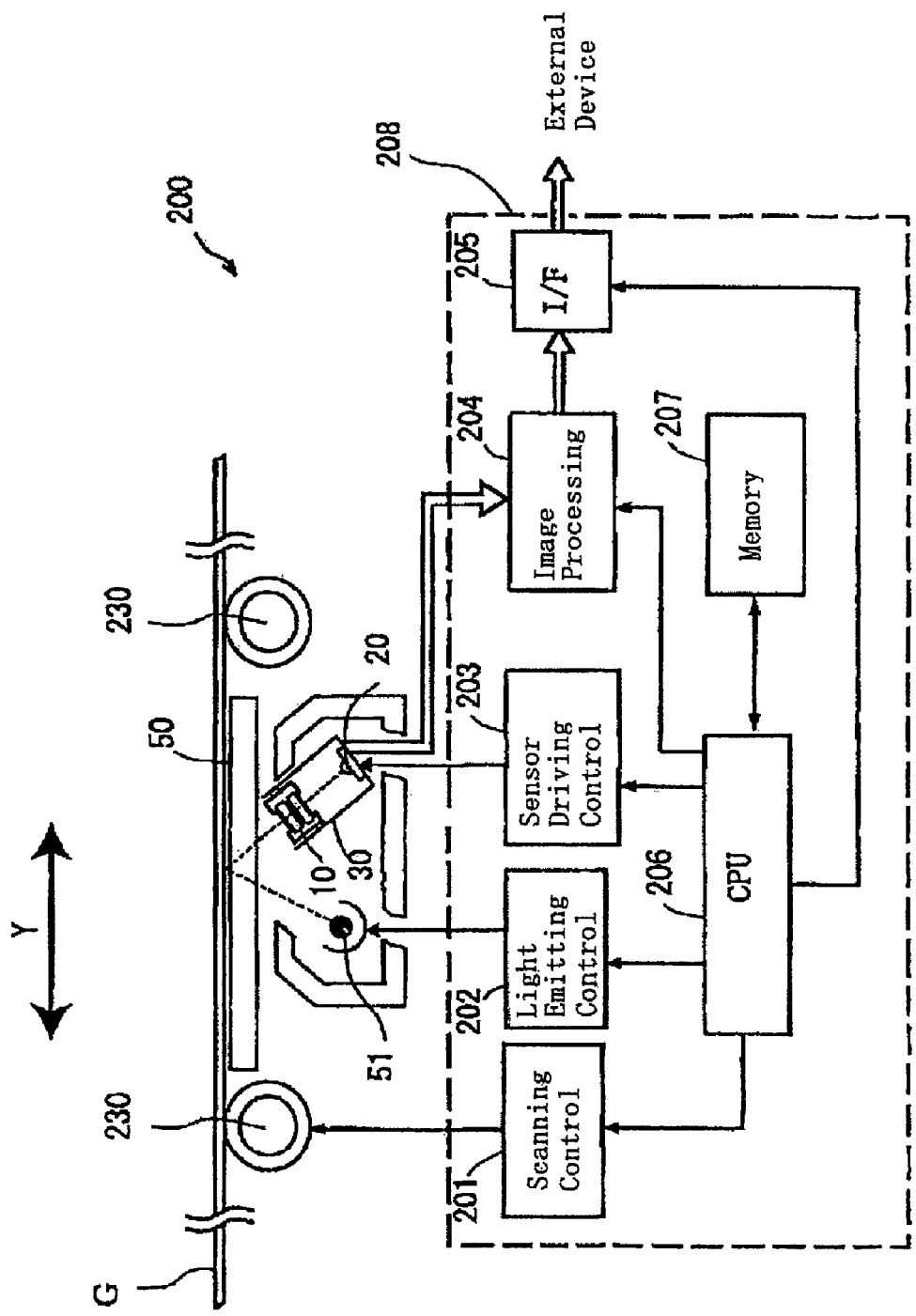
FIG. 7 is a schematic diagram of an image reading apparatus using the optical system that comprise a lens array of an erecting unit magnification system in accordance with the present invention.

FIG. 7 is a schematic diagram of an image reading apparatus using the optical system that comprises the lens array of an erecting unit magnification system in accordance with the present invention. An image scanner 200 as the image reading apparatus comprises a light source 51 for irradiating of light into an original G being put on an original glass plate 50; an image sensor 30 for reading the image information of an original by the reflected light from the original G; a driving source 230 for scanning the original; and a controller circuit 208 for controlling the image scanner. The image sensor 30 comprises a light-receiving element array including a plurality of light-receiving elements for reading the image information of the original G by the reflected light from the original, and a lens array of an erecting unit magnification system according to the present invention, the lens array focusing the reflected light from the original G onto the light-receiving element array.

The controller circuit 208 comprises a scanning control unit 201 for controlling the driving of the driving source 230; a light-emitting control unit 202 for controlling the light emission of a light source 51 in the image sensor 30; a sensor driving control unit 203 for controlling a processing portion of the image sensor that receives the irradiated light from the original G by means of the light-receiving array provided on the image sensor substrate 20 in the image sensor 30 to perform the photo-electric conversion; an image processing unit 204 for processing the image information after the photo-electric conversion that is obtained from the sensor driving control unit 203; an interface unit 205 for outputting the image information after image processing into an external device etc.; a memory unit 207 for storing program required for the image processing, the interface, and several control; and a central processing unit (CPU) 206 for controlling the scanning control unit 201, the light-emitting control unit 202, the sensor driving control unit 203, the image processing unit 204, the interface unit 205 and the memory unit 207.

The image information of the original may be read by scanning the image sensor 30 with respect to the fixed original G in the sub scanning direction (the shown Y direction), while the image information of the original can be read by scanning the original G itself with respect to the fixed image sensor 30 in the image reading apparatus shown in FIG. 7.

Then, an image writing apparatus using a lens array of an erecting unit magnification system according to the present invention is described.

Image Writing Apparatus

Figure 8:
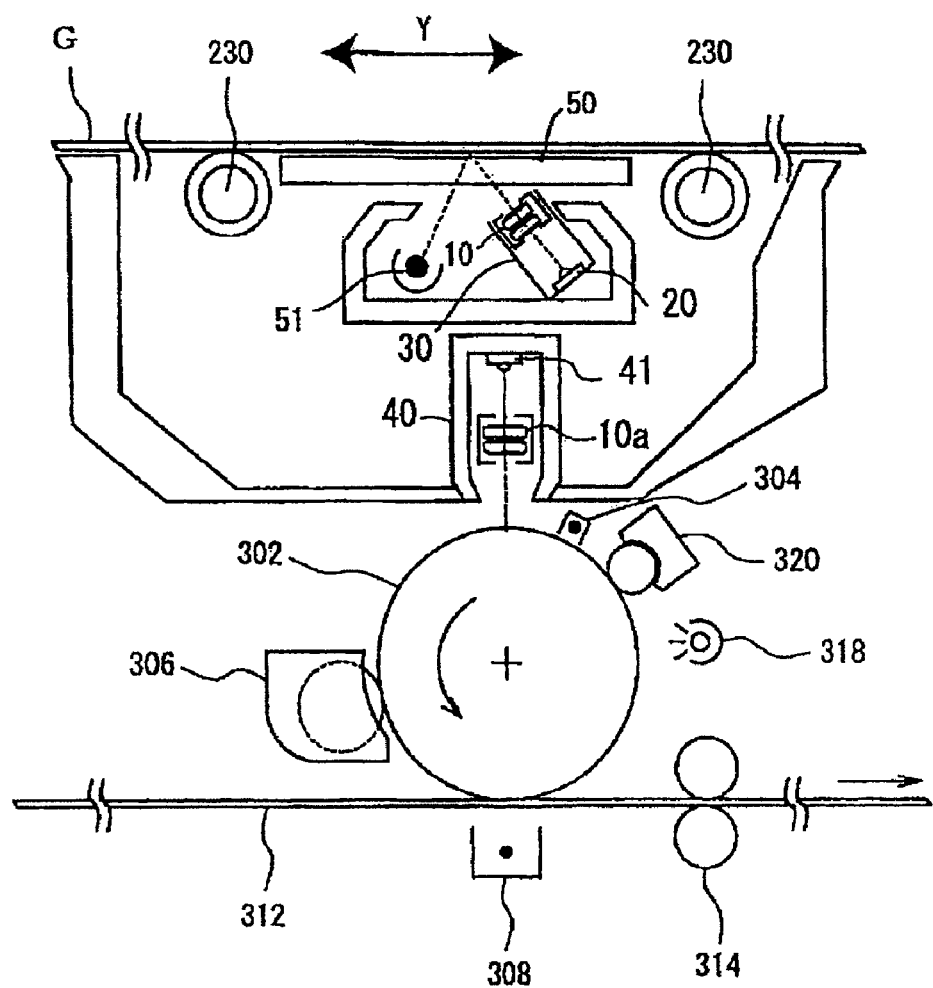
FIG. 8 is a schematic diagram of one electro-photographic apparatus of an image writing apparatus using a lens array of an erecting unit magnification system in accordance with the present invention.

FIG. 8 is a schematic diagram of one electro-photographic apparatus of an image writing apparatus using the lens array of an erecting unit magnification system in accordance with the present invention. The elements, which are identical with respect to FIG. 7, are designated by the same reference signs, and the similar description of them is omitted.

In the electro-photographic apparatus shown in FIG. 8, the light of the light-emitting element array 41 in a optical writing head 40 is emitted based on the image information from the image sensor. Then, the emitted light from the light-emitting point is focused through the lens array 10a of an erecting unit magnification system, and is irradiated onto the surface of the photo-sensitive dram 302. A light-conductive material (photosensitive material), such as amorphous Si, is formed on the surface of the cylindrical photosensitive drum 302. This cylindrical photosensitive drum 302 rotates at the printing speed. The whole surface of the cylindrical photosensitive drum 302 is evenly charged by means of a charging device 304 while rotating. Then, the light corresponding to the dot images for printing is irradiated onto the photosensitive material, and charged portions of the photosensitive material are neutralized by means of the irradiated light. Then, the toner is continuously applied on the photosensitive material with a developing device 306, depending on the state of the charge on the photosensitive material. Then, the toner is transferred on a transported paper 312 by a transfer device 308. The transported paper 312 is heated and fixed with an electro-photographic fixing device 314, and finally the image information of the original G is copied onto the transported paper 312. On the other hand, after the transfer is ended, the charged portions of the photosensitive material are neutralized over the entire surface of the cylindrical photosensitive drum 302 by means of an erasing lamp 318, and the remaining toner on the cylindrical photosensitive drum 302 is removed by means of a cleaning device 320.

While the electro-photographic apparatus has been described in FIG. 8, the structure of the apparatus is substantially similar to a facsimile or a multi-function apparatus, such as a multi-function printer.

It should be understood that a lot of variations and modifications is able to be implemented by the skilled person in the art in the spirit or scope of the present invention, while the specific examples are described in the above-described embodiments. Accordingly, the present invention is not to be considered as limited by the foregoing description but is only limited by the scope of the appended claims.

INDUSTRIAL APPLICABILITY

In accordance with the present invention, a lens array of an erecting unit magnification system that has lower deterioration of the optical performance may be provided. Thereby, the present invention is useful for an image reading apparatus using a contact image sensor with a lens array of an erecting unit magnification system that includes an image scanner, a facsimile, an electro-photographic apparatus, or multi-function apparatus including a multi-function printer etc.; or an image writing apparatus comprising a light-writing head with a lens array of an erecting unit magnification system.

The invention claimed is:

1. A lens array of an erecting unit magnification system, comprising:
    a first planar-shaped lens array plate that includes a plurality of a first outside lenses, which are regularly arranged on one side thereof, and a plurality of a first inside lenses, which are regularly arranged on the other side thereof; and
    a second planar-shaped lens array plate that includes a plurality of a second outside lenses, which are regularly arranged on one side thereof, and a plurality of a second inside lenses, which are regularly arranged on the other side thereof,
    wherein the first and the second planar-shaped lens array plates are stacked so that the first inside lens and the second inside lens are mutually faced, and
    each of the first and the second inside lenses has a first aspherical shape and is formed based on predetermined function so as to decrease the optical aberration of on-optical axis and off-optical axis,
    wherein the first aspherical shape is formed based on curvature correlation function $f_1(\ )$ between section radius $r_H$ and characteristic value, $\sin \eta$, that correspond to predetermined viewing angle $\theta$, where $\eta$ is the angle between the tangential line of the first aspherical shape in the cross section of optical axis direction of the first aspherical shape and the vertical direction line with respect to the optical axis direction therein; $r_H$ is the section radius of the vertical direction to the optical axis direction of the first aspherical shape; and $\theta$ is the viewing angle provided for the first and the second planar-shaped lens array plates.

2. The lens array of an erecting unit magnification system according to claim 1, wherein the curvature correlation function $f_1(\ )$ corresponding to any viewing angle $\theta$ is determined based on the curvature correlation functions $f_1(\ )$ corresponding to predefined viewing angle $\theta$.

3. The lens array of an erecting unit magnification system according to claim 1, wherein the characteristic value, $\sin \eta$, defined by the curvature correlation function $f_1(\ )$ is defined with allowable value, $\sin \eta_f$, representative of:

$$0.95 \times \sin \eta \leq \sin \eta_f \leq \sin \eta \times 1.06, \text{ and}$$

the first aspherical shape is formed based on the allowable value $\sin \eta_f$.

4. The lens array of an erecting unit magnification system according to claim 1, wherein the lens thickness t of one lens plate is defined as relative lens thickness B, and the relative lens thickness B is represented as:

$$B = 2 \times t / Tc,$$

where Tc is the conjugation length of the lens array of an erecting unit magnification unit, and
the characteristic value, $\sin \eta$, defined by the curvature correlation function $f_1(\ )$ is corrected with the correction coefficient based on the relative lens thickness B.

5. An image reading apparatus, comprising:
    a light source for irradiating of light into an original being put on an original glass plate;
    a light-receiving element array for receiving the reflected light from the irradiated original to read the image information of the original; and
    an erecting unit magnification lens array for focusing the reflected light from the original onto the light-receiving array,
    wherein the erecting unit magnification lens array comprises said lens array of the erecting unit magnification system according to claim 1.

6. An image writing apparatus, comprising:
    a light-emitting element array including a plurality of light-emitting elements;
    a photo-sensitive dram for entering the image information based on the emitted light from the light-emitting array; and
    an erecting unit magnification lens array for focusing of the emitted light from the light-emitting element array onto the photo-sensitive dram,
    wherein the erecting unit magnification lens array comprises said lens array of the erecting unit magnification system according to according to claim 1.

7. A lens array of an erecting unit magnification system, comprising:
    a first planar-shaped lens array plate that includes a plurality of a first outside lenses, which are regularly arranged on one side thereof, and a plurality of a first inside lenses, which are regularly arranged on the other side thereof; and
    a second planar-shaped lens array plate that includes a plurality of a second outside lenses, which are regularly arranged on one side thereof, and a plurality of a second inside lenses, which are regularly arranged on the other side thereof,
    wherein the first and the second planar-shaped lens array plates are stacked so that the first inside lens and the second inside lens are mutually faced, and
    each of the first and the second inside lenses has a first aspherical shape and is formed based on predetermined function so as to decrease the optical aberration of on-optical axis and off-optical axis,
    wherein each of the first and the second outside lenses has a second aspherical shape so as to decrease the optical aberration of on-optical axis and off-optical axis.

8. The lens array of an erecting unit magnification system according to claim 7, wherein the second aspherical shape is defined after the first aspherical shape is defined, normalized shift amount $\Delta z'$ is represented by $$\Delta z' = \Delta z / Tc,$$

where Tc is the conjugation length of the lens array of an erecting unit magnification unit, $\Delta z$ is shift amount from the conjugation length Tc, and $\Delta z'$ is the shift amount normalized as the ratio with the conjugation length Tc, and the second aspherical shape is defined within the allowable range from 78% or more to 107% or less of the normalized shift amount $\Delta z'$.

9. An image reading apparatus, comprising:

a light source for irradiating of light into an original being put on an original glass plate;

a light-receiving element array for receiving the reflected light from the irradiated original to read the image information of the original; and an erecting unit magnification lens array for focusing the reflected light from the original onto the light-receiving array, wherein the erecting unit magnification lens array comprises said lens array of the erecting unit magnification system according to claim 7.

10. An image writing apparatus, comprising:

a light-emitting element array including a plurality of light-emitting elements;

a photo-sensitive dram for entering the image information based on the emitted light from the light-emitting array; and an erecting unit magnification lens array for focusing of the emitted light from the light-emitting element array onto the photo-sensitive dram, wherein the erecting unit magnification lens array comprises said lens array of the erecting unit magnification system according to according to claim 7.

* * * * *

UNITED STATES PATENT AND TRADEMARK OFFICE
CERTIFICATE OF CORRECTION

| | | |
|---|---|---|
| PATENT NO. | : 7,903,341 B2 | Page 1 of 1 |
| APPLICATION NO. | : 12/376210 | |
| DATED | : March 8, 2011 | |
| INVENTOR(S) | : Nagata et al. | |

It is certified that error appears in the above-identified patent and that said Letters Patent is hereby corrected as shown below:

In column 16, line 45, In Claim 6, after "according to" delete "according to".

Signed and Sealed this
Fourth Day of October, 2011

David J. Kappos
*Director of the United States Patent and Trademark Office*